United States Patent
Guo et al.

(10) Patent No.: US 8,489,039 B2
(45) Date of Patent: Jul. 16, 2013

(54) BEAMFORMED MULTI-INPUT MULTIPLE-OUTPUT COMMUNICATION WITH UPLINK TRANSMISSION ROTATION

(75) Inventors: Li Guo, Irving, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 787 days.

(21) Appl. No.: 12/236,068

(22) Filed: Sep. 23, 2008

(65) Prior Publication Data

US 2009/0098838 A1 Apr. 16, 2009

Related U.S. Application Data

(60) Provisional application No. 60/979,059, filed on Oct. 10, 2007.

(51) Int. Cl.
| | |
|---|---|
| H04B 1/04 | (2006.01) |
| H04B 1/02 | (2006.01) |
| H04B 7/02 | (2006.01) |
| H04B 7/00 | (2006.01) |
| H04M 1/00 | (2006.01) |
| H04K 1/10 | (2006.01) |
| H04B 7/10 | (2006.01) |
| H04H 20/67 | (2008.01) |
| G01S 3/02 | (2006.01) |

(52) U.S. Cl.
USPC .......... 455/103; 455/91; 455/101; 455/562.1; 375/260; 375/347; 370/339; 342/367; 342/465

(58) Field of Classification Search
USPC ................. 455/103, 101, 91, 562.1; 375/38, 375/40, 347, 260; 370/339, 59, 63, 64; 342/367, 342/463–465
See application file for complete search history.

(56) References Cited

U.S. PATENT DOCUMENTS 5,459,873 A * 10/1995 Moore et al. ............... 455/277.1
6,671,496 B1 * 12/2003 Hoshi ............................ 455/78
(Continued)

FOREIGN PATENT DOCUMENTS

| WO | 2005109677 A1 | 11/2005 |
|---|---|---|
| WO | 2006138555 A2 | 12/2006 |

OTHER PUBLICATIONS

Zhou, S.; Giannakis, G.B.; , "Optimal transmitter eigen-beamforming and space-time block coding based on channel mean feedback," Signal Processing, IEEE Transactions on , vol. 50, No. 10, pp. 2599-2613, Oct. 2002 doi: 10.1109/TSP.2002.803355 URL: http://ieeexplore.ieee.org/stamp/stamp.jsp?tp=&arnumber=1033689 &isnumber=22196.*

Primary Examiner — Temesgh Ghebretinsae
Assistant Examiner — Devan Sandiford
(74) Attorney, Agent, or Firm — Edell, Shapiro & Finnan LLC

(57) ABSTRACT

Techniques are provided to enable computation of beamforming weights for beamforming MIMO wireless communication between first and second wireless communication devices. At the first device comprising a first plurality of antennas, signals are received that are wirelessly transmitted from a different one of a second plurality of antennas of the second device during a corresponding one of a plurality of time slots. The first device computes beamforming weights from the received signals. When signals are to be transmitted from the first device to the second device, the first device applies the beamforming weights to signals to be transmitted from the first plurality of antennas of the first device to the second plurality of antennas of the second device.

23 Claims, 6 Drawing Sheets

U.S. PATENT DOCUMENTS

| | | |
|---|---|---|
| 2004/0018818 A1 | 1/2004 | Hottinen et al. |
| 2005/0185618 A1* | 8/2005 | Friday et al. .................. 370/331 |
| 2006/0203891 A1* | 9/2006 | Sampath et al. .............. 375/132 |
| 2007/0054633 A1 | 3/2007 | Piirainen |
| 2007/0071147 A1* | 3/2007 | Sampath et al. .............. 375/347 |
| 2007/0268815 A1 | 11/2007 | Wee et al. |
| 2009/0042618 A1 | 2/2009 | Hedayat et al. |
| 2009/0054093 A1* | 2/2009 | Kim et al. ..................... 455/500 |

* cited by examiner

BEAMFORMED MULTI-INPUT MULTIPLE-OUTPUT COMMUNICATION WITH UPLINK TRANSMISSION ROTATION

CROSS REFERENCE TO RELATED APPLICATION

This application claims priority to U.S. Provisional Application No. 60/979,059, filed Oct. 10, 2007, the entirety of which is incorporated herein by reference.

TECHNICAL FIELD

The present disclosure relates to wireless communication technology and particularly to multi-input multi-output (MIMO) wireless communication systems.

BACKGROUND

MIMO wireless communication systems comprise multiple-antenna wireless communication devices on both ends of a communication link, e.g., at a base station (BS) and a mobile station (MS). MIMO wireless communication techniques can enhance the radio link reliability and increase the system capacity through diversity gain and multiple signal stream transmission. Beamformed MIMO schemes have demonstrated significant benefits for MIMO systems. Through proper beamforming, the channel condition of a MIMO channel matrix can be improved and so can the signal strength of all the signal streams to be transmitted from one device to the other. However, beamformed MIMO techniques generally require spatial signature information between the antennas of the two devices on the link in order to calculate the beamforming weights.

There are at least two well known methods to capture spatial signature information and calculate beamforming weights for beamformed MIMO systems. There are referred to herein as a "two-sounding" method and a "one-sounding" method. In the two-sounding method, the MS sends training signals separately from two antennas and the MS explicitly informs the BS as to which antenna is used to send the training signals during a training session. This method requires corresponding communication protocol messages to coordinate and support the transmission of the training messages.

In the one-sounding method, the MS only sends signals from one of its antennas and consequently the BS can only receive signals from that particular MS antenna. Therefore, the BS can only obtain the required information for one MS antenna, and must estimate the channel conditions for the other antenna using some mathematical modeling techniques which cannot always be reliable.

It would be desirable to employ techniques that significantly reduce system and communication protocol requirements to capture the spatial signature information and estimate the beamforming weights for a beamformed MIMO wireless communication system.

DESCRIPTION OF EXAMPLE EMBODIMENTS

Overview

Techniques are provided herein to enable computation of beamforming weights for beamforming multiple-input multiple-output (MIMO) wireless communication between first and second wireless communication devices. At the first device comprising a first plurality of antennas, signals are received that are wirelessly transmitted from a different one of a second plurality of antennas of the second device during a corresponding one of a plurality of time slots. The first device computes beamforming weights from the received signals. When data is to be transmitted from the first device to the second device, the first device applies the beamforming weights to signals to be transmitted from the first plurality of antennas of the first device to the second plurality of antennas of the second device. In the proposed approach, the second device is only required to alternate transmit antennas for uplink transmissions of signals to the first device. The first device is "blind", i.e., has no knowledge, as to which antenna the second device is transmitting signals from during any given time slot. The first device simply captures the received signals over several time slots or frames and estimates the beamforming weights from the received signals using any of a variety of computations examples of which are described herein.

Figure 1:
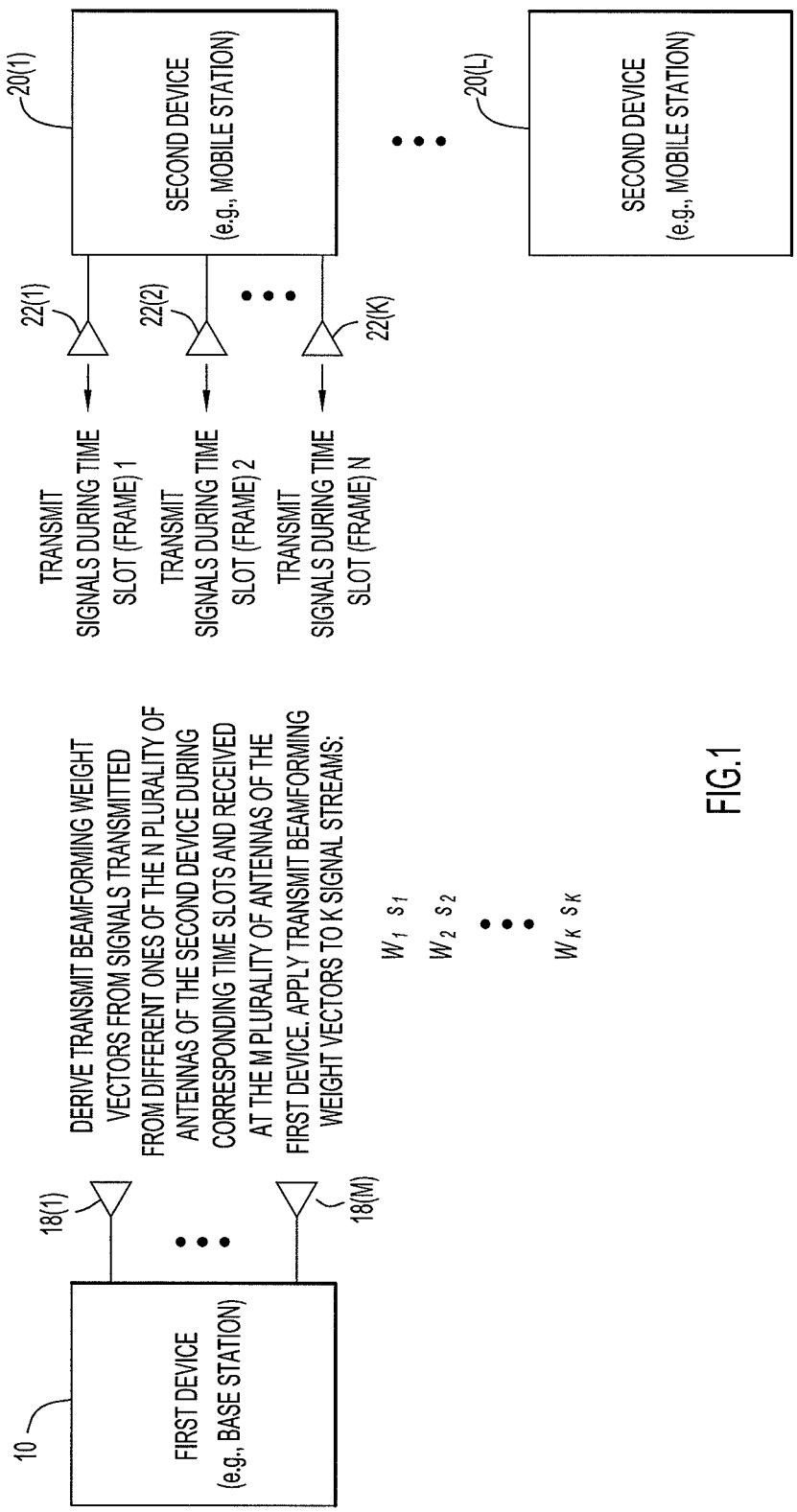
FIG. 1 is an example of a wireless communication system employing an uplink transmit rotation technique between first and second wireless communication devices.

Referring first to FIG. 1, an example of a wireless communication system is shown generally at 5, and comprises a first wireless communication device 10 and at least one second wireless communication device 20(1). The first device 10 is, for example, a base station (BS) and the second device 20(1) is, for example, a mobile station (MS). The BS 10 may connect to other wired data network facilities (not shown) and in that sense serves as a gateway or access point through which a plurality of MS's 20(1)-20(L) have access to those data network facilities. For purposes of an example described herein, the BS 10 is communicating with a particular MS, e.g., MS 20(1).

The BS 10 comprises a plurality of antennas 18(1)-18(M) and the MS 20(1) comprises a plurality of antennas 22(1)-22(K). The BS 10 may wirelessly communicate with the MS 20(1) using a wideband wireless communication protocol in which the bandwidth is much larger than the coherent frequency bandwidth. An example of such a wireless communication protocol is the IEEE 802.16 communication standard, also known commercially as WiMAX™. Another example of a wireless communication protocols is the IEEE 802.11 communication standard, also know commercially as WiFi™.

When the MS 20(1) transmits signals to the BS 10, the MS 20(1) performs a transmit rotation technique such that the signals are transmitted from only a single one of the plurality of antennas 22(1)-22(K) during any given time slot or frame. The transmitted signals may comprise any type of signal, such as a training signal, pilot signals, traffic signals, etc. The term "traffic" is meant to refer to actual data that the MS 20(1) transmits to the BS 10, which may be, for example, audio, video, data, etc., and in some cases data may be interspersed with so-called pilot signals. For example, one technique known in the art (and used in the WiMAX standard) is to employ an orthogonal frequency division multiple access (OFDMA) technique whereby signals to be transmitted are allocated to subcarriers that span a frequency band, and where a group of subcarriers transmitted during any given time interval may comprise data subcarriers (that carry data) and pilot subcarriers (that carry a known pilot signal value). The pilot subcarriers are used to allow the receiving device to derive information about the communication channel over which the transmission is made. The transmit rotation technique may be applied to signals that are transmitted in this format such that both data signals and pilot signals associated with the data signals transmitted over multiple time slots are subjected to the transmit rotation technique described herein. As an example depicted in FIG. 1, the MS 20(1) may transmit signals from antenna 22(1) during time slot 1, then transmit signals during time slot 2, and so on. Thus, the MS 20(1) rotates on which one of its antenna signals are transmitted from to the BS 10.

The BS 10 receives at its plurality of antennas 18(1)-18(M) the signals transmitted from different ones of the K plurality of antennas of the MS 20(1) during corresponding time slots. Using the signals received at its antennas 18(1)-18(M) from the rotating antenna transmit scheme, the BS 10 computes transmit beamforming weight vectors $W_1$-$W_K$ that are used by the BS 10 when performing beamforming MIMO transmission of multiple signal streams $S_1$-$S_k$ simultaneously to the MS 20(1). The BS 10 may perform similar computations for signals it receives by others of the plurality of MS's 20(1)-20(L) that perform the transmit rotation technique. Each of the beamforming weight vectors $W_1$-$W_K$ is a 1×M vector.

Figure 2:
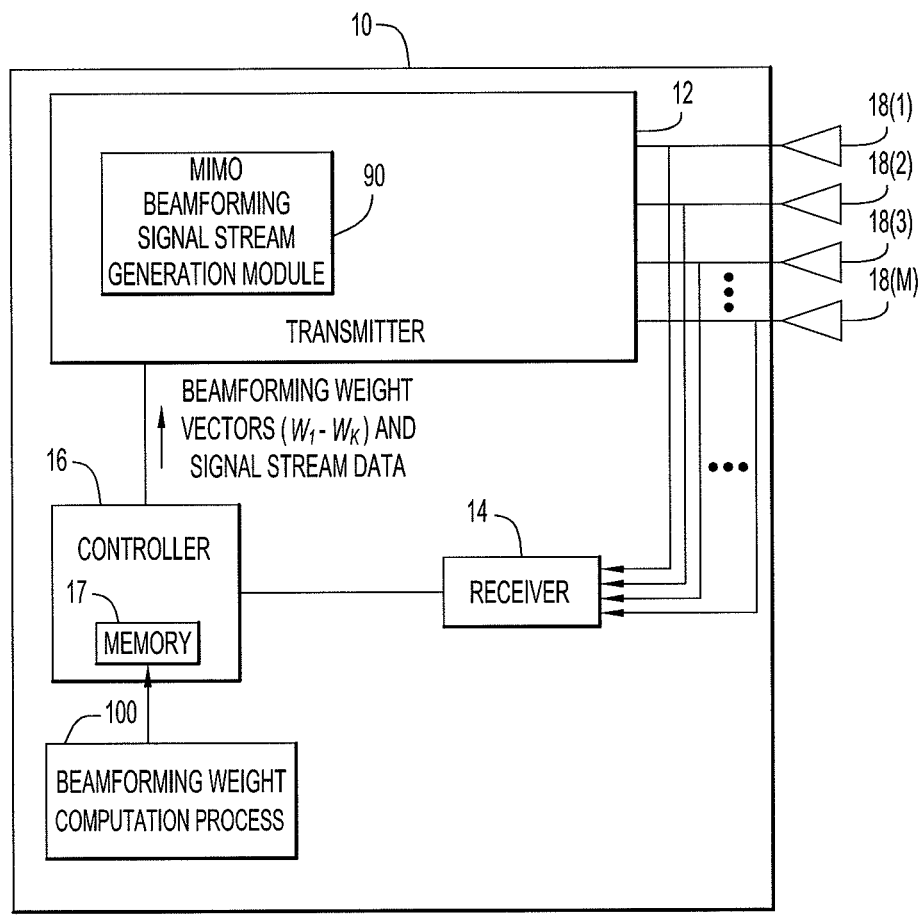
FIG. 2 illustrates an example of a block diagram of a wireless communication device configured to compute beamforming weights based on received signals transmitted according to the uplink transmit rotation technique.

Turning to FIG. 2, an example of a block diagram is shown of the BS 10 that is configured to compute beamforming weights from signals received from an MS that transmits signals using the transmit rotation technique. The BS 10 comprises a transmitter 12, a receiver 14 and a controller 16. The controller 16 supplies data to the transmitter 12 to be transmitted and processes signals received by the receiver 14. In addition, the controller 16 performs other transmit and receive control functionality. Part of the functions of the transmitter 12 and receiver 14 may be implemented in a modem and other parts of the transmitter 12 and receiver 14 may be implemented in radio transmitter and radio transceiver circuits. It should be understood that there are analog-to-digital converters (ADCs) and digital-to-analog converters (DACs) in the various signal paths to convert between analog and digital signals.

The transmitter 12 may comprise individual transmitter circuits that supply respective upconverted signals to corresponding ones of a plurality of antennas 18(1)-18(M) for transmission. For simplicity, these individual transmitter circuits are not shown. To this end, the transmitter 12 comprises a MIMO beamforming signal stream generation module 90 that applies beamforming weight vectors $W_1$-$W_K$ to a plurality of signal streams to be transmitted via the antennas 18(1)-18(M). The receiver 14 receives the signals detected by each of the antennas and supplies corresponding antenna-specific receive signals to controller 16. It is understood that the receiver 14 may comprise a plurality of individual receiver circuits, each for a corresponding one of a plurality of antennas and which outputs a receive signal associated with a signal detected by a respective one of the plurality of antennas 18(1)-18(M). For simplicity, these individual receiver circuits are not shown.

The controller 16 comprises a memory 17 or other data storage block that stores data used for the techniques described herein. The memory 17 may be separate or part of the controller 16. In addition, logic instructions for performing a beamforming weight computation process 100 may be stored in the memory 17 for execution by the controller 16. The process 100 generates the beamforming weight vectors $W_1$-$W_K$ that are supplied to the transmitter 12 for use by the beamforming signal stream(s) generation module 90.

The functions of the controller 16 may be implemented by logic encoded in one or more tangible media (e.g., embedded logic such as an application specific integrated circuit, digital signal processor instructions, software that is executed by a processor, etc.), wherein the memory 17 stores data used for the computations described herein (and/or to store software or processor instructions that are executed to carry out the computations described herein). Thus, the process 100 may be implemented with fixed logic or programmable logic (e.g., software/computer instructions executed by a processor). Moreover, the functions of the beamforming signal stream generation module 90 and the process 100 may be performed by the same logic component, e.g., the controller 16, which may also perform modem functions.

Figure 3:
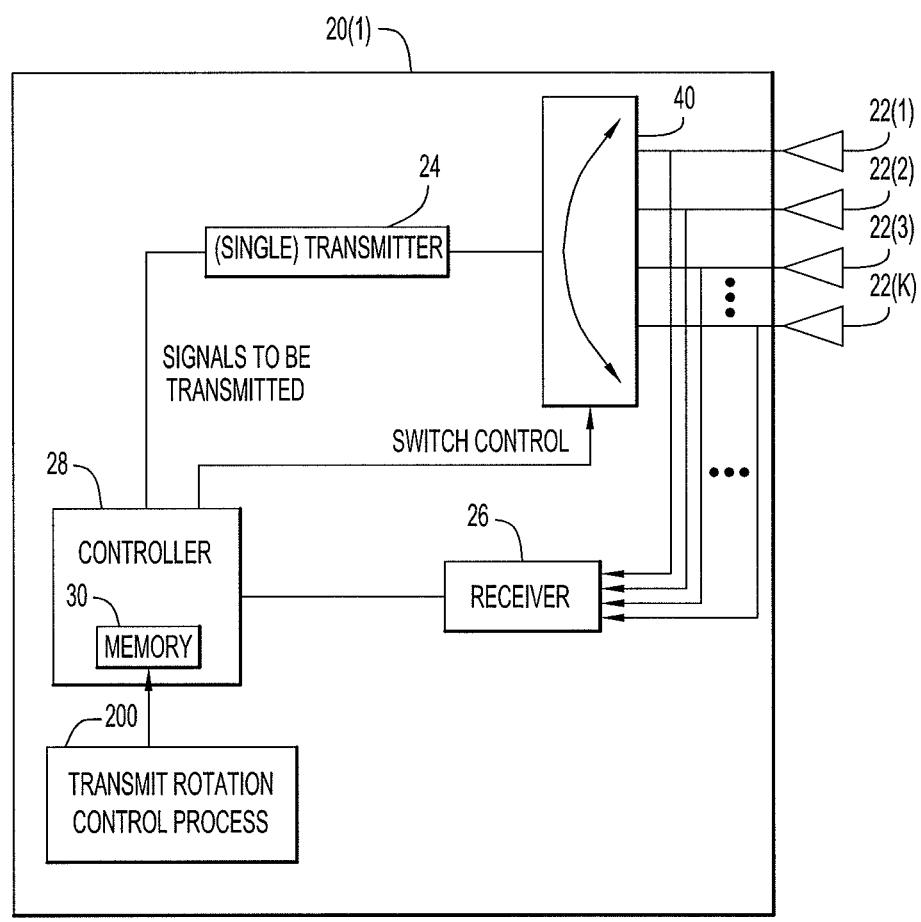
FIG. 3 illustrates an example of a block diagram of a wireless communication device configured to transmit signals according to the uplink transmit rotation technique.

Turning to FIG. 3, an example of a block diagram of the MS 20(1) is shown. The MS 20(1) comprises a transmitter 24, a receiver 26 and a controller 28. The controller comprises a memory 29 that stores data and instructions. The transmitter 24 is, in one embodiment, a single transmitter circuit. The MS 20(1) further comprises a toggle switch 40 that connects between the transmitter 24 and the plurality of antennas 22(1)-22(K). Thus, the toggle switch 40 serves as a 1×K switch that routes the output of the transmitter 24 to one of the plurality of antennas 22(1)-22(K). The controller 28 supplies a switch control signal to the toggle switch 40 that controls the toggle switch 40 to connect the output of the transmitter to one, and only one, of the plurality of antennas 22(1)-22(K) when signals are to be transmitted (and output by the transmitter 24) during a time slot or frame. In this regard, logic instructions for a transmit rotation control process 200 may be stored in the memory for execution by the controller 28 during transmission of signals from the MS 20(1) to the BS 10.

Figure 4:
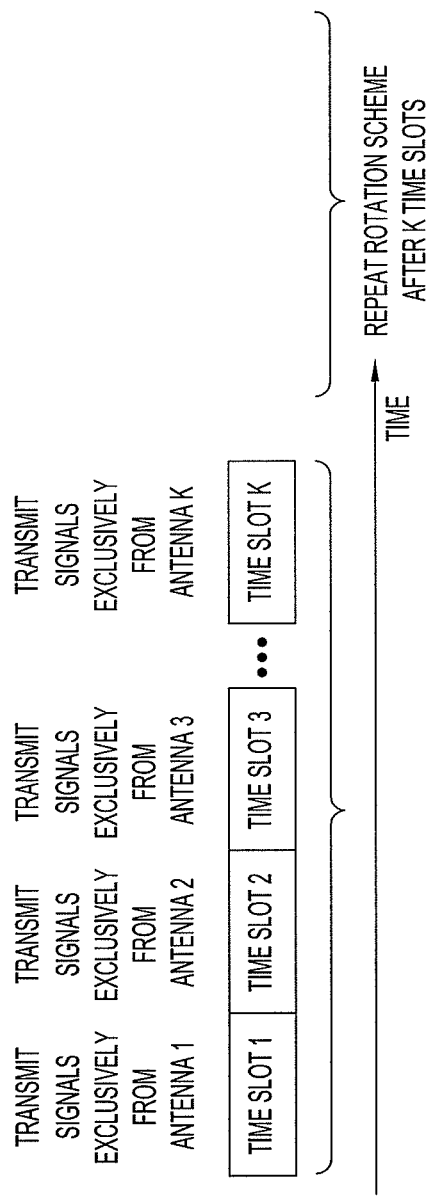
FIG. 4 is a timing diagram depicting an example of the uplink transmit rotation technique.

Turning to FIG. 4, operation of the transmit rotation technique is described in more detail following the example of FIGS. 1 and 3 where the MS 20(1) has K antennas. Reference is continued to be made to FIG. 3 for the description of FIG. 4. According to the transmit rotation technique, the MS 20(1) alternates antennas when transmitting signals to the BS 10. However, the BS 10 is completely "blind" and (need not know) as to which of the plurality of antennas 20(1)-20(K) the MS 20(1) is transmitting from. For example, when transmitting signals during a first time slot or frame, the controller 28, under control of the transmit rotation control process 200, generates the switch control signal to cause the toggle switch 40 in the MS 20(1) to connect the output of the transmitter 24 to antenna 22(1) ("antenna 1"). When transmitting signals during a second or subsequent time slot or frame, the controller 28 generates the switch control signal to cause the toggle switch 40 in the MS 20(1) to connect the output of the transmitter 24 to the antenna 22(2) ("antenna 2"). Similarly, when transmitting signals during the next time slot or frame, the controller 28 generates the switch control signal to cause the toggle switch 40 in the MS 20(1) to connect the output of the transmitter 24 to the antenna 22(3) ("antenna 3"). This rotation continues until signals transmitted during the Kth time slot from antenna 22(K), and then it repeats again for the next K time slots. Thus, to summarize, herein the controller 28 is configured to generate the switch control signal to control the switch to rotate signals to be transmitted among the plurality of antennas 22(1)-22(K) during different time slots according to a rotation sequence and to repeat the rotation sequence after its completion over a predetermined number of time slots.

One simple example of the transmit rotation technique is the case where the MS 20(1) has two antennas (K=2). This is a rather typical example because it is desirable for certain applications to keep the cost of MS's low and one way to do that is to reduce the amount of hardware required in the MS. With two antennas, the MS 20(1) need have only two receiver circuits, one for each antenna. In addition, as indicated above in connection with FIG. 3, an MS may be designed to have a single transmitter circuit such that it can transmit from only one antenna at any given time, even though it can simultaneously receive signals transmitted by the BS 10 and detected by all of the MS's antennas. In the example of an MS with first and second antennas, the transmit rotation control process 200 may be designed such that for "even" numbered time slots or frames, the toggle switch switches to the first antenna so that the MS 20(1) transmits signals from the first antenna, and during "odd" numbered time slots or frames, the toggle switch 40 switches to the second antenna so that the MS 20(1) transmits from the second antenna. It is understood that the process could be configured to switch to the second antenna during "odd" numbered time slots and to switch to the first antenna during "even" numbered time slots.

Figure 5:
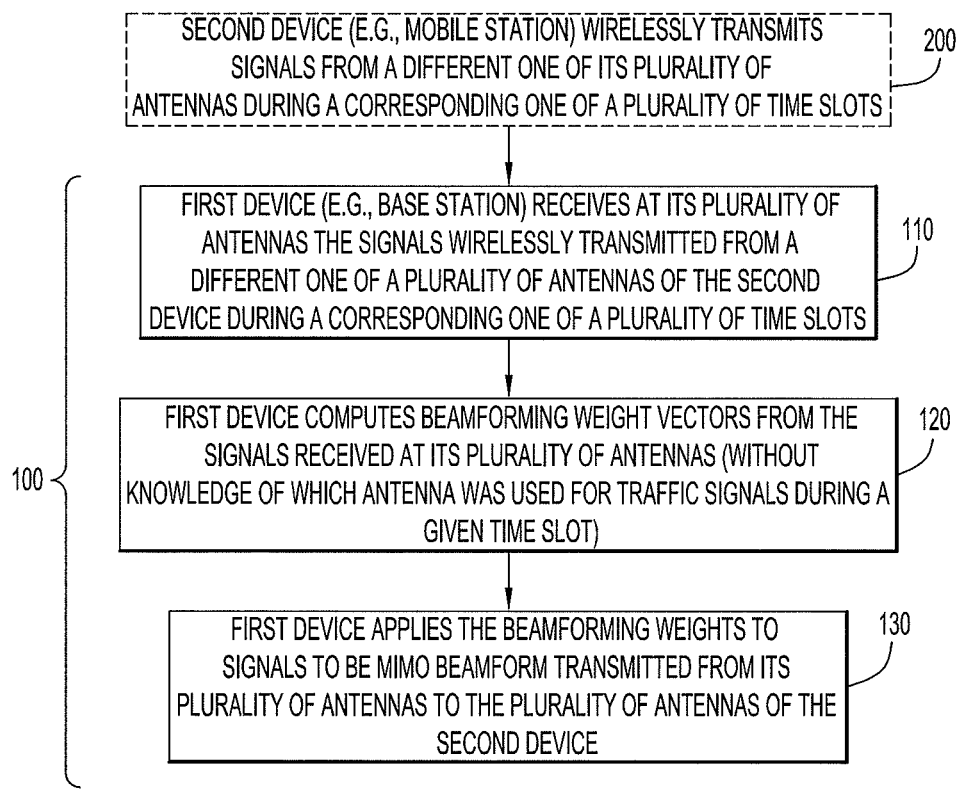
FIG. 5 is a flow chart depicting the uplink transmit rotation technique and the beamforming weight computation process performed in a device based on received signals that were transmitted according to the uplink transmit rotation technique.

Turning now to FIG. 5, interaction of the beamforming weight computation process 100 and the transmit rotation control process 200 is now described. The MS, e.g., MS 20(1), performs the transmit rotation control process 200 when transmitting signals to the BS 10 such that it wireless transmits signals from a different one of its plurality of antennas 22(1)-22(K) during a corresponding one of a plurality of time slots 200.

The BS 10 performs a beamforming weight computation process 100 based on the signals it receives at its plurality of antennas 18(1)-18(M). At 110, the BS 10 receives at its plurality of antennas 18(1)-18(M) the signals transmitted from a different one of the plurality of antennas 22(1)-22(K) during a corresponding one of the plurality of time slots. Again, the BS 10 does not have knowledge as to which of the antennas the MS 20(1) is transmitting from in any given time slot or frame. The BS 10 does not need this knowledge and knows only that the signals were transmitted from a single one of the plurality of antennas 22(1)-22(K) during a given time slot. At 120, the BS 10 computes beamforming weight vectors from the traffic signals it received at its plurality of antennas (again without knowledge of which antenna was used for transmitting signals during a given time slot). Next, at 130, when the BS 10 has signals queued up for transmission to the MS 20(1), it uses the beamforming weight vectors computed at 120 to MIMO beamform multiple (K) signal streams simultaneously from the BS antennas 18(1)-18(M) to the MS antennas 22(1)-22(K), as shown in FIG. 1.

A more detailed example for the process 100 is now provided. In this example, the MS 20(1) has two antennas (K=2). At 110, the BS 10 collects signals for at least two time slots or frames, e.g., one frame is an "even" numbered frame the other frame is an "odd" numbered frame. In each frame, the MS 20(1) transmits several symbols. For each transmitted symbol, the BS 10 receives the signals on each of its antennas 18(1)-18(M). For each of the transmitted symbols in a frame or time slot, the BS 10 generates a receive symbol vector:

$$\vec{S} = \begin{bmatrix} s_0 \\ s_1 \\ \vdots \\ s_{M-1} \end{bmatrix}.$$

For each frame (comprising N symbols), the BS generates a set of N symbol vectors:

$$\vec{S}_0 = \begin{bmatrix} s_{0,0} \\ s_{0,1} \\ \vdots \\ s_{0,M-1} \end{bmatrix}, \vec{S}_1 = \begin{bmatrix} s_{1,0} \\ s_{1,1} \\ \vdots \\ s_{1,M-1} \end{bmatrix}, \ldots, \vec{S}_{N-1} = \begin{bmatrix} s_{N-1,0} \\ s_{N-1,1} \\ \vdots \\ s_{N-1,M-1} \end{bmatrix},$$

At 120, the BS 10 computes a covariance matrix for each frame:

$$Cov = \frac{1}{N} \sum_{n=0}^{N-1} \vec{S}_n \vec{S}_n^H$$

where $\vec{S}_n^H$ denotes the conjugate transpose of $\vec{S}_n$.

If the BS 10 collects data for P frames, the BS 10 computes a set of P covariance matrices: $Cov_1, Cov_2, \ldots Cov_P$. The BS 10 computes the sum of all covariance matrixes:

$$R = Cov_1 + Cov_2 + \ldots + Cov_M,$$

where the matrix R is a combined covariance matrix produced from the plurality of covariance matrices associated with received signals during a corresponding one of a plurality of time slots.

After the combined covariance matrix R is computed, the beamforming weight vectors $W_1$-$W_K$ are computed. There are numerous techniques that may be employed to compute the beamforming weight vectors. The following are some examples.

An eigenvalue decomposition is computed for the combined covariance matrix R to obtain the eigenvectors of the matrix R that corresponding to the K largest eigenvalues of the matrix R. These eigenvectors may be denoted $\vec{V}_1 \ldots \vec{V}_K$. According to one embodiment, the eigenvectors may be used directly as the beamforming weight vectors $W_1$-$W_K$ such that $W_1 = \vec{V}_1, W_2 = \vec{V}_2, \ldots, W_K = \vec{V}_K$ and so on. That is, values for the K beamforming weight vectors $W_1$-$W_K$ are set to the K eigenvectors of the combined covariance matrix R.

According to another embodiment, K intermediate matrices are computed from the eigenvectors $\vec{V}_1 \ldots \vec{V}_K$, such that:

$$R_1 = \left( \alpha \sum_{i=2}^{K} \vec{V}_i \vec{V}_i^H + \sigma^2 I \right)^{-1} \vec{V}_1 \vec{V}_1^H$$

$$R_2 = \left( \alpha \sum_{i=1, \neq 2}^{K} \vec{V}_i \vec{V}_i^H + \sigma^2 I \right)^{-1} \vec{V}_2 \vec{V}_2^H$$

...

-continued $$R_K = \left(\alpha\sum_{i=1}^{K-1} \vec{V}_i\vec{V}_i^H + \sigma^2 I\right)^{-1} \vec{V}_K\vec{V}_K^H,$$

where $\alpha$ is a positive number between 0 and 1, and can be changed dynamically, $\sigma$ is a noise standard deviation and I is the identity matrix. The eigenvalue decomposition is then computed for each of these intermediate matrices, such that beamforming weight vector $W_1$ is the eigenvector of intermediate matrix $R_1$ corresponding to the largest eigenvalue of intermediate matrix $R_1$, beamforming weight vector $W_2$ is the eigenvector corresponding to the largest eigenvalue of intermediate matrix $R_2$, . . . , and beamforming weight vector $W_K$ is the eigenvector corresponding to the largest eigenvalue of intermediate matrix $R_K$.

In an example where the BS 10 comprises 8 antennas (M=8) and the MS 20(1) has two antennas (K=2), the combined covariance matrix R is an 8-by-8 matrix. The eigenvalue decomposition of R is computed to obtain the eigenvectors of R that correspond to the two largest eigenvalues of R, and these vectors are denoted $\vec{V}_1$ and $\vec{V}_2$. $\vec{V}_1$ and $\vec{V}_2$ may be used directly as the beamforming weight vectors, i.e., $\vec{W}_1 = \vec{V}_1$ and $\vec{W}_2 = \vec{V}_2$.

Alternatively, two intermediate matrices are computed from $\vec{V}_1$ and $\vec{V}_2$:

$$R_1 = (\alpha\vec{V}_2\vec{V}_2^H + \sigma^2 I)^{-1}\vec{V}_1\vec{V}_1^H,$$

$$R_2 = (\alpha\vec{V}_1\vec{V}_1^H + \sigma^2 I)^{-1}\vec{V}_2\vec{V}_2^H$$

where $\alpha$, $\sigma$ and I are as defined above. The eigenvalue decompositions of matrices $R_1$ and $R_2$ are then computed. Beamforming weight vector $\vec{W}_1$ is the eigenvector of $R_1$, which corresponds to the largest eigenvalue of matrix $R_1$ and beamforming weight vector $\vec{W}_2$ is the eigenvector corresponding to the largest eigenvalue of matrix $R_2$.

Figure 6:
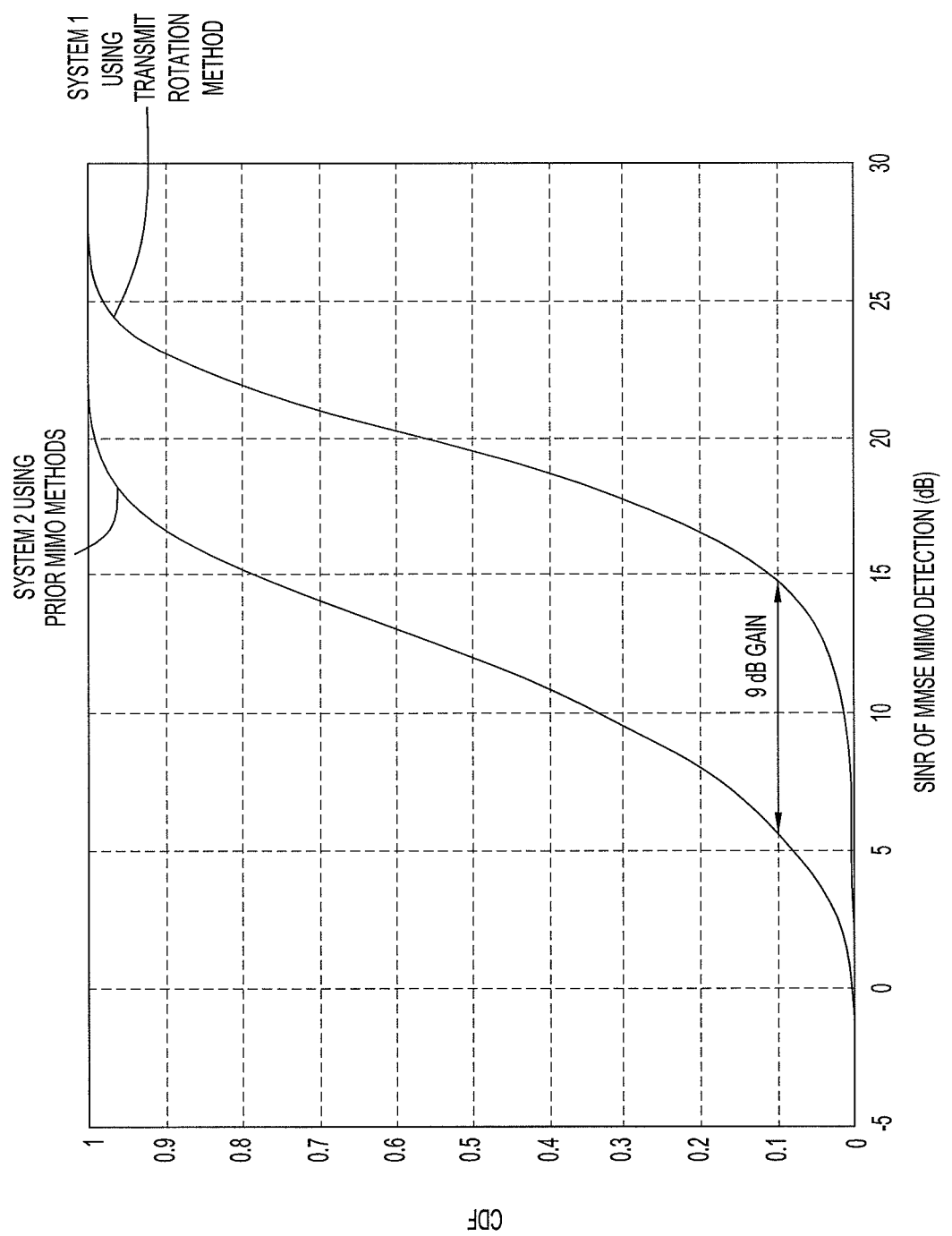
FIG. 6 is a plot showing an example of the improvement in system performance that may be achieved using the transmit rotation technique.

Experiments have shown that the techniques described herein can achieve significant improvement in the performance of MIMO wireless communication system. FIG. 6 illustrates simulation results for an example where the performance of a first system (system 1) is compared with the performance of a second system (system 2). In system 1, a BS having eight antennas communicates with a MS having two antennas, and the BS and MS in system 1 use the transmit rotation technique described herein. In system 2, the BS has two antennas and the MS has two antennas and a traditional MIMO transmission technique is employed. The results in FIG. 6 show approximately 9 dB signal quality improvement in system 1 (using the transmit rotation technique) over system 2.

Compared to previous beamformed MIMO wireless communication methods, the transmit rotation technique described herein reduces the system complexity, improves performance and enhances algorithm reliability. In particular, unlike the aforementioned two-sounding method, the transmit rotation technique does not require that the BS explicitly know which MS antenna is used for an uplink transmission at any given time slot. This reduces communication protocol requirements. The aforementioned one-sounding method computes an estimate or "guess" of the channel information associated with antennas other than the one used for the training signal. Thus, the one-sounding method is highly dependent on system modeling and cannot ensure that the information hypothesis is always reliable. By contrast, the transmit rotation technique involves the BS collecting information associated with signals transmitted from all MS antennas for purposes of calculating the beamforming weight vectors. The information used in the proposed method is much more reliable.

The techniques described herein are applicable to any multiple access scheme that uses frequency division for multiple access channelization, including frequency division multiple access (FDMA), time division multiple access (TDMA), multi-carrier code division multiple access (MC-CDMA) and orthogonal frequency division multiplex multiple access (OFDMA), and any combination thereof (whether synchronized or unsynchronized) and whether deployed in a frequency division duplex (FDD) or time division duplex (TDD) configuration.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
    providing a first device comprising a plurality of first antennas and a second device comprising a plurality of second antennas;
    at the second device, wirelessly transmitting signals from the second antennas in a rotating sequence during a plurality of time slots such that all of the second antennas transmit the respective signals over a time interval encompassing the time slots and, during any one of the time slots, only one of the second antennas transmits a corresponding one of the signals, none of the transmitted signals carrying information identifying the respective second antennas from which the signals were transmitted;
    at the first device:
    receiving the signals from the second device over the time interval blindly as to from which of the second antennas the signals were transmitted during any one of the time slots;
    computing beamforming weights from the signals received over the time interval; and
    applying the beamforming weights to other signals to be transmitted from the first plurality of antennas of the first device to the second plurality of antennas of the second device.

2. The method of claim 1, wherein computing the beamforming weights comprises:
    computing a covariance matrix from the signals received by the first antennas over the time interval; and
    computing the beamforming weights from the covariance matrix.

3. The method of claim 2, wherein computing the beamforming weights comprises:
    computing a combined covariance matrix from a sum of covariance matrices of signals received over the time interval; and
    decomposing the combined covariance matrix by eigenvalue decomposition to obtain K eigenvectors corresponding to the largest K eigenvalues of the combined covariance matrix, where K corresponds to the number of second antennas.

4. The method of claim 3, wherein applying the beamforming weights comprises:
applying the K eigenvectors of the combined covariance matrix as the beamforming weights.

5. The method of claim 3, wherein computing the beamforming weights further comprises:
computing K intermediate matrices from the K eigenvectors;
decomposing each of the K intermediate matrices by eigenvalue decomposition to produce an eigenvector corresponding to the largest eigenvalue of the corresponding intermediate matrix; and
applying each such eigenvector as the beamforming weights to the signals to be transmitted from the first antennas.

6. The method of claim 1, wherein computing the beamforming weights comprises:
computing a plurality of beamforming weight vectors; and
wherein applying the beamforming weights comprises:
applying the plurality of beamforming weight vectors to a respective signal streams signals to be transmitted from respective antennas of the first device for simultaneous beamforming multiple-input multiple-output transmission thereof.

7. The method of claim 1, wherein wirelessly transmitting by the second device includes:
wirelessly transmitting the signals from a single transmitter electrically coupled in each of the time slots to only one of the second antennas in the rotating sequence thereof; and
repeating the rotation sequence after completion thereof.

8. A system comprising:
a first device comprising a plurality of first antennas and a second device comprising a plurality of second antennas in a rotating sequence and a transmitter configured to transmit signals through the second antennas during a plurality of time slots such that all of the second antennas transmit the respective signals over a time interval encompassing the time slots and, during any one of the time slots, only one of the second antennas transmits a corresponding one of the signals, none of the transmitted signals carrying information identifying the respective second antennas from which the signals were transmitted; and
wherein the first device further comprises:
a receiver coupled to the first antennas and configured to produce receive signals representative of signals received by the first antennas; and
a controller coupled to the receiver, wherein the controller is configured to:
collect the receive signals produced from the signals transmitted from the second device over the time interval blindly as to from which of the second antennas the signals were transmitted during any one of the time slots;
compute beamforming weights from the receive signals collected over the time interval; and
apply the beamforming weights to transmit signals to be transmitted from the first antennas to the second antennas of the second device.

9. The system of claim 8, wherein the controller is configured to:
compute the beamforming weights from a covariance matrix of the collected receive signals; and
compute the beamforming weights from the covariance matrix.

10. The system of claim 9, wherein the controller is configured to:
compute the beamforming weights by summing a plurality of covariance matrices of signals received over the time interval into a combined covariance matrix; and
decompose the combined covariance matrix by eigenvalue decomposition to obtain K eigenvectors corresponding to the largest K eigenvalues of the combined covariance matrix, where K corresponds to the number of the second antennas.

11. The system of claim 10, wherein the controller is configured to set values for K beamforming weight vectors from the K eigenvectors of the combined covariance matrix.

12. The system of claim 10, wherein the controller is configured to:
compute the beamforming weights by computing K intermediate matrices from the K eigenvectors; and
decompose the K intermediate matrices by eigenvalue decomposition to produce respective eigenvectors each corresponding to the largest eigenvalue of the respective intermediate matrices, wherein each such eigenvector corresponds to one of the K beamforming weight vectors.

13. The system of claim 8, wherein the controller is configured to:
compute a plurality of beamforming weight vectors; and
apply the beamforming weight vectors as the beamforming weights to respective signal streams for simultaneous beamforming multiple-input multiple-output transmission via the first antennas.

14. One or more non-transitory computer readable tangible media encoded with logic for execution and when executed operable to:
compute beamforming weights from signals received over a time interval encompassing a plurality of time slots at a plurality of first antennas, the signals being transmitted from a plurality of second antennas of another communication apparatus in a rotating sequence over the time slots such that all of the second antennas transmit the respective signals over the time interval and, during any one of the time slots, only one of the second antennas transmits a corresponding one of the signals, none of the transmitted signals carrying information identifying the respective second antennas from which the signals were transmitted, the beamforming weights being computed blindly as to from which of the second antennas the signals were transmitted during any one of the time slots; and
apply the beamforming weights to signals to be transmitted from the first antennas to the second antennas of the other communication apparatus.

15. The non-transitory computer readable media of claim 14, wherein the logic that is operable to:
compute the beamforming weights comprises logic operable to compute at least one covariance matrix from the signals received over the time slots; and
compute the beamforming weights from the at least one covariance matrix.

16. The non-transitory computer readable media of claim 15, wherein the logic that is operable to compute the beamforming weights comprises logic operable to:
sum covariance matrices of signals received over the time interval into a combined covariance matrix; and
decompose the combined covariance matrix by eigenvalue decomposition to obtain K eigenvectors corresponding to the largest K eigenvalues of the combined covariance matrix, where K corresponds to the number of the second antennas of the other communication apparatus.

17. The non-transitory computer readable media of claim 16, wherein the logic operable to compute the beamforming weights comprises logic operable to set values of the K eigenvectors of the combined covariance matrix to K beamforming weight vectors.

18. The non-transitory computer readable media of claim 16, wherein the logic operable to compute the beamforming weights comprises logic operable to:
compute K intermediate matrices from the K eigenvectors; and
decompose each of the K intermediate matrices by eigenvalue decomposition to produce an eigenvector corresponding to the largest eigenvalue of the corresponding intermediate matrix, wherein each such eigenvector corresponds to one of the K beamforming weight vectors.

19. An apparatus comprising:
a plurality of first antennas;
a receiver coupled to the plurality of first antennas and configured to produce individual receive signals associated with signals intercepted by the respective first antennas; and
a controller coupled to the receiver, wherein the controller is configured to:
collect the receive signals produced from signals transmitted in a rotating sequence from another communication apparatus over a time interval blindly as to from which of a plurality of second antennas at the other communication apparatus the signals were transmitted during any one of the time slots, the signals transmitted from the other communication apparatus being transmitted such that all of the second antennas transmit the respective signals over the time interval, during any one of the time slots, only one of the second antennas transmits a corresponding one of the signals, and none of the transmitted signals carry information identifying the respective second antennas from which the signals were transmitted;
compute beamforming weights from the collected receive signals; and
apply the beamforming weights to signals to be transmitted from the first plurality of antennas to the other communication apparatus.

20. The apparatus of claim 19, wherein the controller is configured to:
compute the beamforming weights from a covariance matrix of the collected receive signals; and
compute the beamforming weights from the covariance matrix.

21. The apparatus of claim 20, wherein the controller is configured to:
compute the beamforming weights by summing a plurality of covariance matrices of signals received over the time interval into a combined covariance matrix; and
decompose the combined covariance matrix by eigenvalue decomposition to obtain K eigenvectors corresponding to the largest K eigenvalues of the combined covariance matrix, where K corresponds to the number of the second antennas.

22. The apparatus of claim 21, wherein the controller is configured to set values for K beamforming weight vectors from the K eigenvectors of the combined covariance matrix.

23. The apparatus of claim 21, wherein the controller is configured to:
compute the beamforming weights by computing K intermediate matrices from the K eigenvectors; and
decompose the K intermediate matrices by eigenvalue decomposition to produce respective eigenvectors each corresponding to the largest eigenvalue of the respective intermediate matrices, wherein each such eigenvector corresponds to one of the K beamforming weight vectors.

* * * * *